US011858398B2

(12) United States Patent
Bruni et al.

(10) Patent No.: US 11,858,398 B2
(45) Date of Patent: Jan. 2, 2024

(54) MOTOR VEHICLE PORTABLE TRAY

(71) Applicant: First Pull Co., Volo, IL (US)

(72) Inventors: Philip Roger Bruni, Tower Lakes, IL (US); John Steven Kruse, Tower Lakes, IL (US)

(73) Assignee: FIRST PULL CO., Tower Lakes, IL (US)

( * ) Notice: Subject to any disclaimer, the term of this patent is extended or adjusted under 35 U.S.C. 154(b) by 27 days.

(21) Appl. No.: 17/474,300

(22) Filed: Sep. 14, 2021

(65) Prior Publication Data

US 2021/0402905 A1 Dec. 30, 2021

Related U.S. Application Data

(63) and a continuation-in-part of application No. 29/726,700, filed on Mar. 5, 2020, now Pat. No. Des. 932,420.

(60) Provisional application No. 63/083,226, filed on Sep. 25, 2020.

(51) Int. Cl.

| | |
|---|---|
| ***B60N 3/00*** | (2006.01) |
| ***B60R 7/04*** | (2006.01) |
| *A47B 31/06* | (2006.01) |

(52) U.S. Cl.

CPC .............. *B60N 3/002* (2013.01); *B60R 7/043* (2013.01); *A47B 31/06* (2013.01)

(58) Field of Classification Search

CPC ......... B60N 3/002; B60R 7/043; A47B 31/06; A47B 13/16

USPC ......................................... 108/44, 42, 43, 25

See application file for complete search history.

(56) References Cited

U.S. PATENT DOCUMENTS

| | | | | |
|---|---|---|---|---|
| 2,285,576 A | | 6/1942 | Fox | |
| 2,633,180 A | * | 3/1953 | Reed | B60N 2/787 312/235.8 |
| 2,741,521 A | * | 4/1956 | Bernie | B60N 3/004 108/135 |
| 2,880,046 A | | 3/1959 | Black | |
| 2,897,974 A | * | 8/1959 | Cook | A47G 23/06 211/74 |
| 2,971,572 A | * | 2/1961 | Watkins | A45C 9/00 297/411.24 |

(Continued)

FOREIGN PATENT DOCUMENTS

| | | |
|---|---|---|
| CA | 532596 A | 11/1956 |

*Primary Examiner* — Jose V Chen

(74) *Attorney, Agent, or Firm* — Klintworth & Rozenblat IP LLP

(57) ABSTRACT

A portable tray is provided for use in a motor vehicle. The portable tray includes a base adapted to be supported on a vehicle seat and a pair of spaced apart legs depending therefrom. A front end is positionable toward a front portion of the seat, and a rear end is positionable toward a rear portion of the seat. An upper planar surface of the base provides a level support surface for articles being used by an occupant of the motor vehicle. At least one cavity into which articles can be placed is provided. A recess is provided through the side wall and is in communication with the cavity, and allows for an object to pass therethrough and into the cavity. An opening provided is the base and a strap having a seat anchor attached thereto extends through the opening. The strap has a thickened portion which is positioned on one side of the rear wall to secure the strap to the base.

17 Claims, 8 Drawing Sheets

20 64 28 22 50 58 60 52 58 56 30 54 58 46 46 44 44 36 56 66 38 56 64 68 26 48 24 48

(56) References Cited

U.S. PATENT DOCUMENTS 2,986,438 A * 5/1961 Smathers ............... A47B 31/06 108/26
3,118,704 A * 1/1964 Meserve ................ B60N 2/787 297/411.24
3,181,483 A 5/1965 De Witt et al.
3,244,125 A * 4/1966 Mackey ................. A47B 31/06 D12/419
3,326,445 A * 6/1967 Goings .................. A47B 31/06 211/74
3,687,092 A * 8/1972 Manning .................. A47B 3/12 297/DIG. 2
3,828,994 A * 8/1974 Hollins .................. B60N 2/809 224/544
3,909,092 A 9/1975 Kiernan
3,922,973 A 12/1975 Sturgeon
4,010,696 A * 3/1977 Priesman ............. A47B 23/001 108/19
D264,525 S 5/1982 Page, Jr.
4,832,241 A 5/1989 Radcliffe
5,170,720 A * 12/1992 Scheurer ................ B60N 3/002 108/146
5,221,032 A * 6/1993 Bott ....................... A47G 23/06 224/678
D362,837 S 10/1995 Mankey et al.
5,479,866 A * 1/1996 Rae ...................... A47B 23/001 108/44
5,556,181 A * 9/1996 Bertrand .................. A47B 9/00 108/14
D380,727 S 7/1997 Gilstrap
5,647,075 A * 7/1997 Perkins ..................... A45F 3/22 108/26
5,762,250 A * 6/1998 Carlton ................ A47B 23/002 206/320
5,850,956 A * 12/1998 Hayward, Jr. ............ A45F 5/00 220/737
5,862,933 A * 1/1999 Neville .................. B60N 3/002 220/17.1
D415,995 S 11/1999 Kanchl, Jr.
D419,521 S 1/2000 Leschke et al.
6,015,198 A * 1/2000 Stair ....................... B60R 7/043 297/188.11
6,109,188 A * 8/2000 Russell .................. B60N 3/002 108/44
6,279,798 B1 * 8/2001 Partch .................... B60N 2/286 297/188.2
6,349,729 B1 * 2/2002 Meyer .................. A47B 23/002 132/73
D474,733 S 5/2003 Webb
6,607,418 B2 * 8/2003 Henry .................... A63H 33/32 446/166
6,662,732 B2 * 12/2003 Birsel .................... A47B 21/00 108/26
D484,843 S 1/2004 Wyszogrod
6,910,429 B1 * 6/2005 Matay ...................... B25H 3/06 108/44
6,976,434 B2 * 12/2005 Roig ....................... B63B 22/24 108/25
7,290,746 B1 * 11/2007 Macias .................. A47C 7/705 248/314
7,806,305 B1 * 10/2010 Moore, Jr. ................ A45F 5/00 224/265
8,091,486 B1 * 1/2012 Broaddrick .......... A47B 23/002 248/444
8,186,282 B1 * 5/2012 Sinchok ............... A47B 13/021 108/147.12
8,261,920 B1 * 9/2012 Matthews ............. A47K 17/00 108/42
9,003,978 B1 * 4/2015 Fabricatore ............ F16M 13/00 108/43
9,220,337 B1 * 12/2015 Wenzel .................... A47B 3/12
9,295,348 B2 3/2016 Johnson
10,160,364 B2 * 12/2018 Howe ...................... A47B 5/06
D846,315 S * 4/2019 Lin ................................ D6/707
D859,876 S * 9/2019 Melaragno .................. D6/406.1
2004/0094587 A1 * 5/2004 Harden .................. B60N 3/107 224/926
2004/0112259 A1 * 6/2004 Zeiders ................ A47B 23/041 108/43
2005/0051584 A1 * 3/2005 Shelmon ................ B60N 3/002 224/544
2006/0261644 A1 * 11/2006 Cutshall ................. B60N 3/002 297/173
2007/0113757 A1 5/2007 Lilly
2007/0114143 A1 * 5/2007 Miskin ................... B60N 3/002 206/217
2007/0119348 A1 * 5/2007 Evans .................... B60N 3/002 108/43
2016/0037905 A1 * 2/2016 Glover ..................... A47B 3/12 108/42
2017/0042321 A1 * 2/2017 Clause ................... A47B 37/04
2017/0127811 A1 * 5/2017 Young .................... A47G 23/06
2017/0369172 A1 * 12/2017 Matthews .......... B64D 11/0627
2018/0236365 A1 * 8/2018 Hradisky ................ B29C 41/04
2019/0084461 A1 * 3/2019 Le Corre ............. A47B 13/081
2019/0084462 A1 * 3/2019 Howe .................... A47B 37/04

* cited by examiner 20
24
48
38
22
52
66
62

20
44
44
46
64
58
64
56
54
30
22
56
58
66
52
60
46
28
56
58
50
46
62
62

MOTOR VEHICLE PORTABLE TRAY

CROSS-REFERENCE TO RELATED APPLICATION

This application is a continuation-in-part application of U.S. patent application Ser. No. 29/726,700 filed on Mar. 5, 2020, and claims the domestic benefit of U.S. provisional application Ser. No. 63/083,226, filed on Sep. 25, 2020, the contents of which are incorporated herein by reference.

FIELD OF THE DISCLOSURE

This disclosure relates to trays and, more particularly, to a portable tray for use in a motor vehicle.

BACKGROUND

Motor vehicle trays are known in the art and provide the driver or a passenger with a convenient place to temporary place items during operation of the motor vehicle. U.S. Pat. No. 3,909,092 discloses a portable container having a plurality of compartments formed by dividers or partitions. U.S. Pat. No. 6,015,198 discloses a portable in-car work station having a plurality of compartments. U.S. Pat. No. 3,244,125 discloses an auto date tray having legs and depressions.

SUMMARY

A portable tray for use in a motor vehicle includes a base adapted to be supported on a vehicle seat and a pair of spaced apart legs depending therefrom. The base includes a front end, a rear end, opposite sides and an upper wall defining an upper surface and a lower surface, a side wall depending from the upper wall and defining one of the sides. The front end is positionable toward a front portion of the seat. The rear end is positionable toward a rear portion of the seat. The upper surface includes a planar portion operating as a level support surface for articles being used by an occupant of the motor vehicle. A cavity extends down from the upper surface and forms a cup into which articles can be placed A recess is provided through the side wall and is in communication with the cavity. An object can pass through the recess and into the cavity.

A portable tray for use in a motor vehicle includes a base adapted to be supported on a vehicle seat and a pair of spaced apart legs depending therefrom. The base includes a front end, a rear end, opposite sides and an upper wall defining an upper surface and a lower surface, a rear wall depending from the rear wall and defining the rear end. The front end is positionable toward a front portion of the seat. The rear end is positionable toward a rear portion of the seat. The upper surface includes a planar portion operating as a level support surface for articles being used by an occupant of the motor vehicle. At least one cavity extends down from the upper surface and forms a cup into which articles can be placed. The rear wall has an opening provided therethrough. A strap having a seat anchor attached thereto is provided and extends through the opening. The strap has a thickened portion which is positioned on one side of the rear wall to secure the strap to the base.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
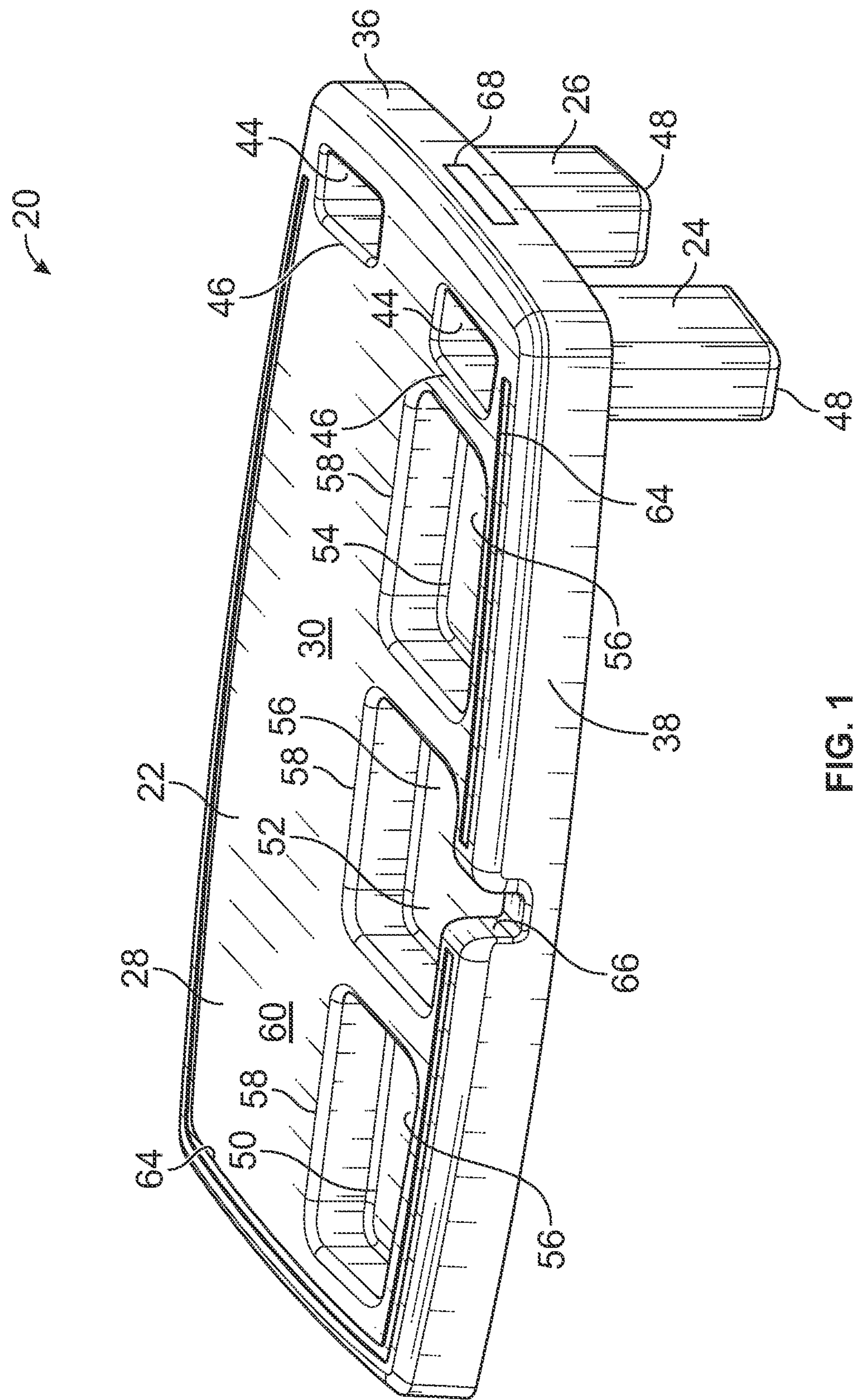
FIG. 1 depicts a top perspective view of a portable tray for use in a motor vehicle.
Figure 2:
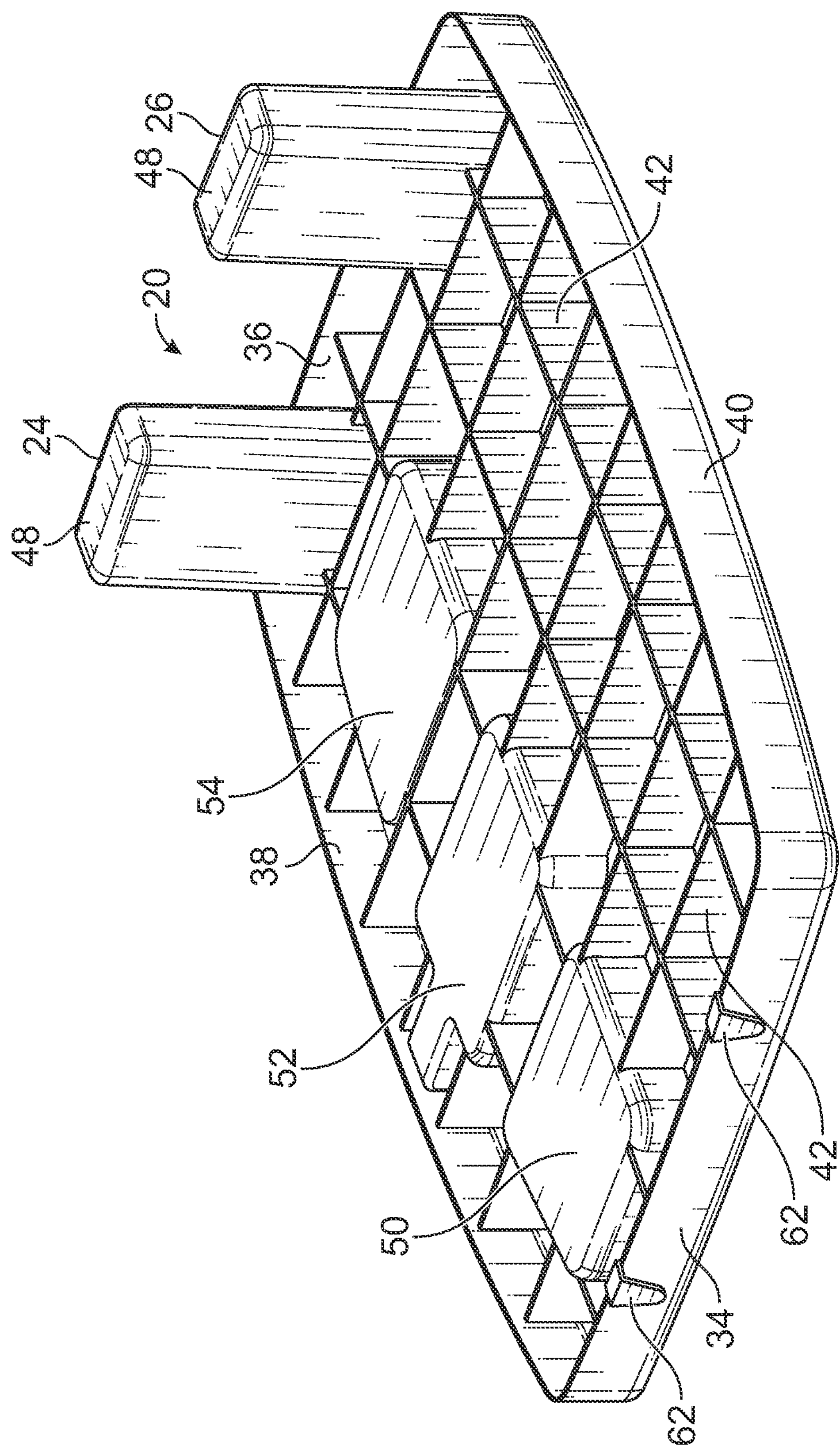
FIG. 2 depicts a bottom perspective view of the portable tray.
Figure 3:
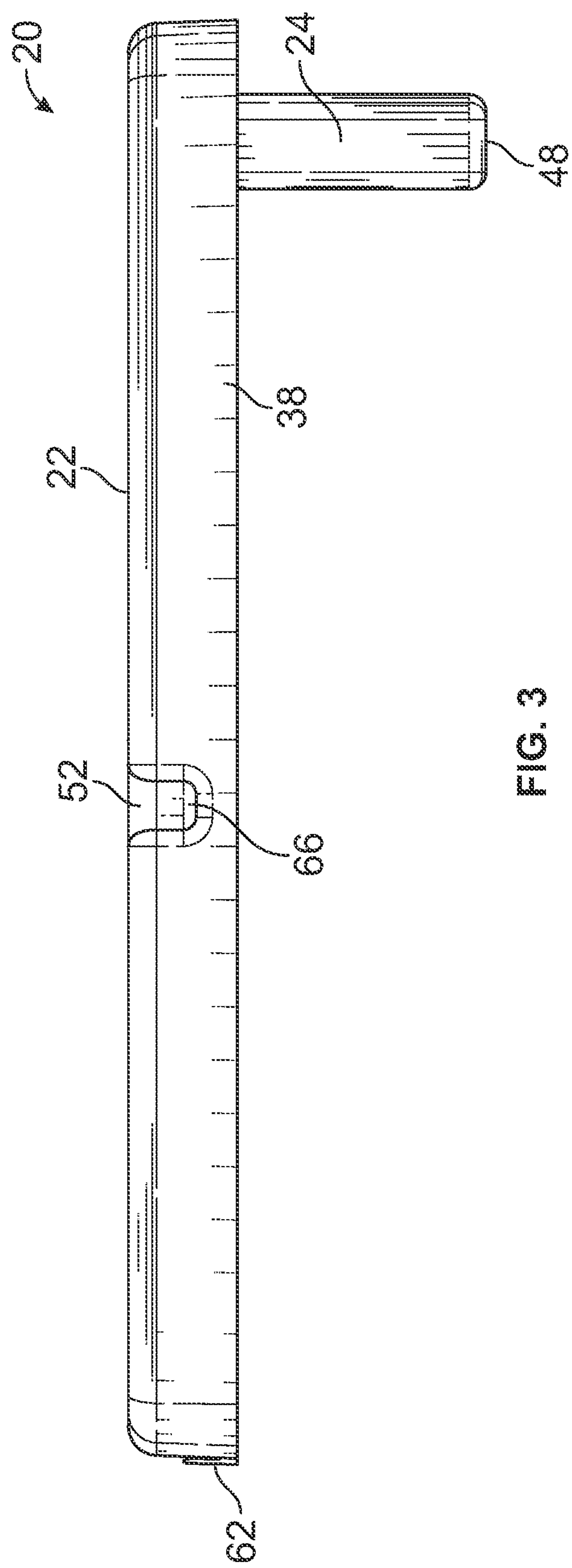
FIG. 3 depicts a side elevation view of the portable tray.
Figure 4:
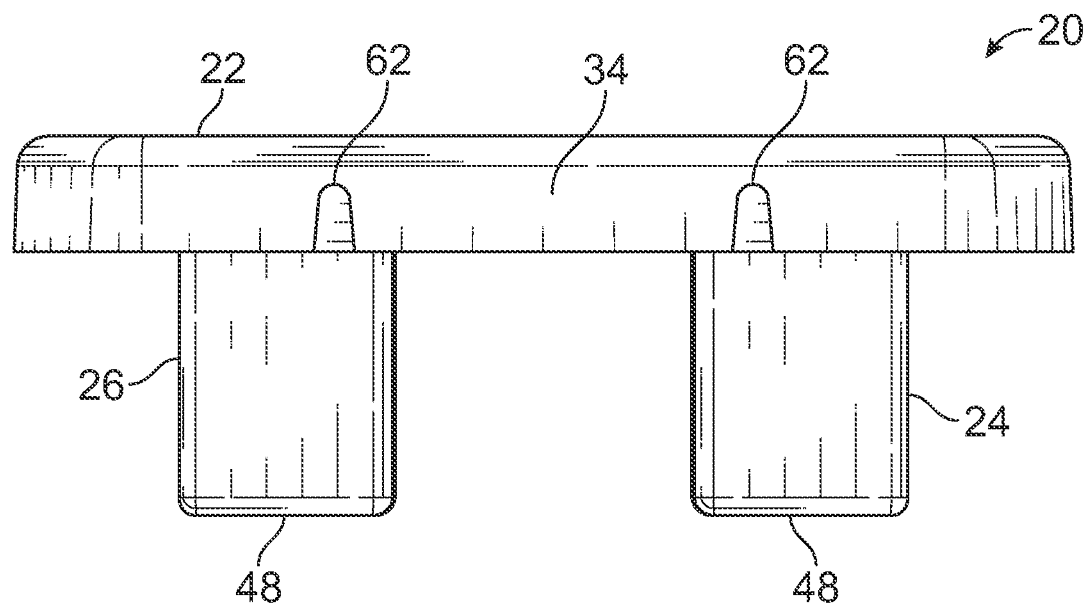
FIG. 4 depicts a front elevation view of the portable tray.
Figure 5:
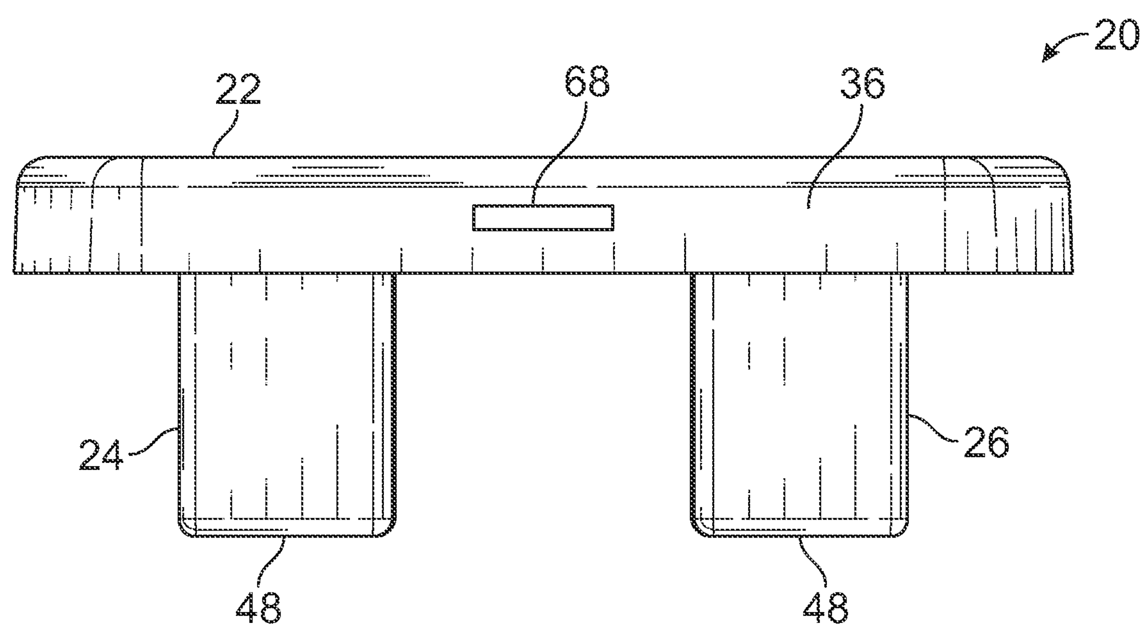
FIG. 5 depicts a rear elevation view of the portable tray.
Figure 6:
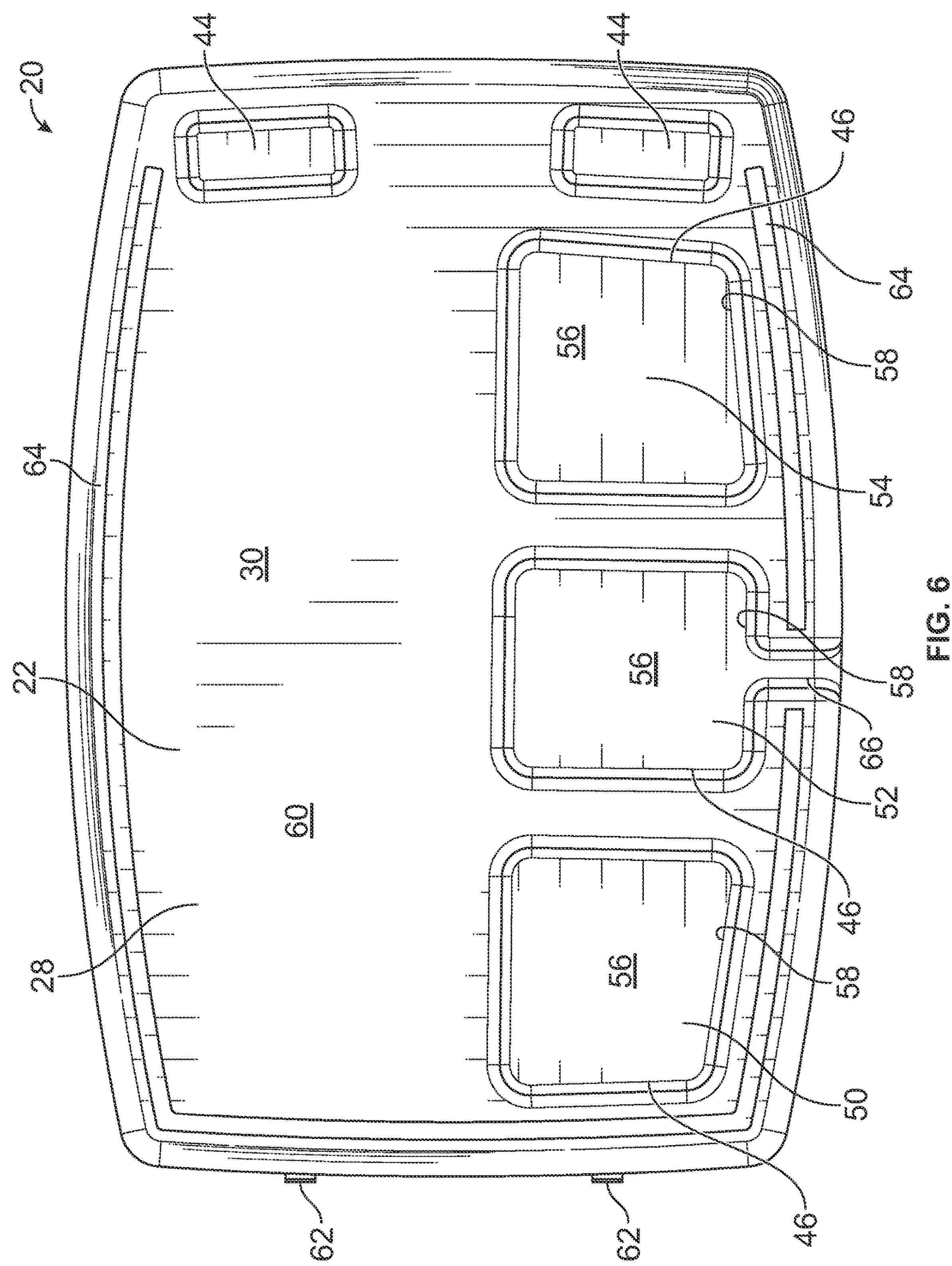
FIG. 6 depicts a top plan view of the portable tray.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

As shown in FIGS. 1-7, a motor vehicle tray 20 includes a base 22, and first and second legs 24, 26 which depend from the base 22. The tray 20 is adapted to sit on a seat (not shown) of a motor vehicle. The base 22 and legs 24, 26 generally form an L-shape.

The base 22 has an upper planar wall 28 which defines an upper surface 30 and a lower surface 32, front and rear walls 34, 36 extending downwardly from the lower surface 32, side walls 38, 40 extending downwardly from the lower surface 32 and between the front and rear walls 34, 36, and a plurality of strengthening ribs 42 which extend downwardly from the lower surface 32. Lower ends of the walls 34, 36, 38, 40 and the ribs 42 form a lower end of the base 22. The side walls 38, 40 define sides which extend between front and rear ends defined by the front and rear walls 34, 36.

The first leg 24 depends downwardly from the lower surface 32 of the upper wall 28 and is proximate to the rear wall 36 and the side wall 38. The second leg 26 depends downwardly from the lower surface 32, is proximate to the rear wall 36 and the side wall 40, and is spaced apart from the first leg 24. Each leg 24, 26 may be hollow such that a cavity 44 is formed in each leg 24, 26 which extends from an opening 46 in the upper surface 30. Each leg 24, 26 may have a grip material (not shown), such as rubber, provided at the lower end 48 of each leg 24, 26. In an embodiment, each leg 24, 26 is perpendicular to the upper wall 28. In an embodiment, each lower end 48 is parallel to the upper wall 28.

A plurality of spaced apart cups 50, 52, 54 may be formed in the upper wall 28 and depend downwardly from the lower surface 32 of the upper wall 28. Each cup 50, 52, 54 has a cavity 56 formed therein which extends from an opening 58 in the upper surface 30 into which articles being used by an occupant of the motor vehicle can be placed. As shown, the cups 50, 52, 54 are proximate to the side wall 38 and are linearly aligned, however, the cups 50, 52, 54 may be positioned at any desired position. Positioning of the cups 50, 52, 54 proximate to the side wall 38 and being linearly aligned provides a large planar area 60 next to the cups 50, 52, 54 operating as a level support surface for resting of other articles being used by an occupant of the motor vehicle. While three cups 50, 52, 54 are shown, more or fewer cups may be provided.

The tray 20 sits on an empty seat of the vehicle with the legs 24, 26 proximate to the seat back (where the user would rest his/her back) and the lower end 48 of each leg 24, 26 engaged with the upper surface of the seat cushion (where the user would sit upon). The front wall 34 is proximate to, or overhangs the front end of the seat cushion, with the lower end of the front wall 34 or the lower ends of the ribs 42 engaged with the upper surface of the seat cushion. A driver or passenger uses the tray 20 as a level surface to place items and keep them secure, organize, or for a recreational use, such as a game board. The grip material on the lower end 48 of each leg 24, 26 assists in deterring the tray 20 from slipping off of the seat.

In an embodiment, the tray 20 includes spaced apart hooks 62 extending from the front wall 34. The driver or the passenger can use the hooks 62 to hang bags, such as a trash bag. While two hooks 62 are shown, more or fewer hooks 62 may be provided.

In an embodiment, a gripping member 64, which may be formed of rubber, is attached to the upper surface 30 and extends upwardly therefrom. In an embodiment, the gripping member 64 is proximate to the front and side walls 34, 38, 40 and generally forms a U-shape. In an embodiment, the gripping member 64 is proximate to the front and side walls 34, 38, 40, between the side wall 38 and the cavities 56, and generally forms a U-shape. The gripping member 64 assists in securing larger items, such as a pizza box, from slipping off of the tray 20.

In an embodiment, a recess 66 is provided through the side wall 38 and is in communication with the cup 52 (the recess 66 could also be provided with either of cups 50, 54). A cable (not shown) of a phone charger can pass through the recess 66 and into the cup 50 in the event that a phone (not shown) is within the cup 52 and being charged. When the tray 20 is being used in the passenger seat, the recess 66 may face the driver.

Figure 7:
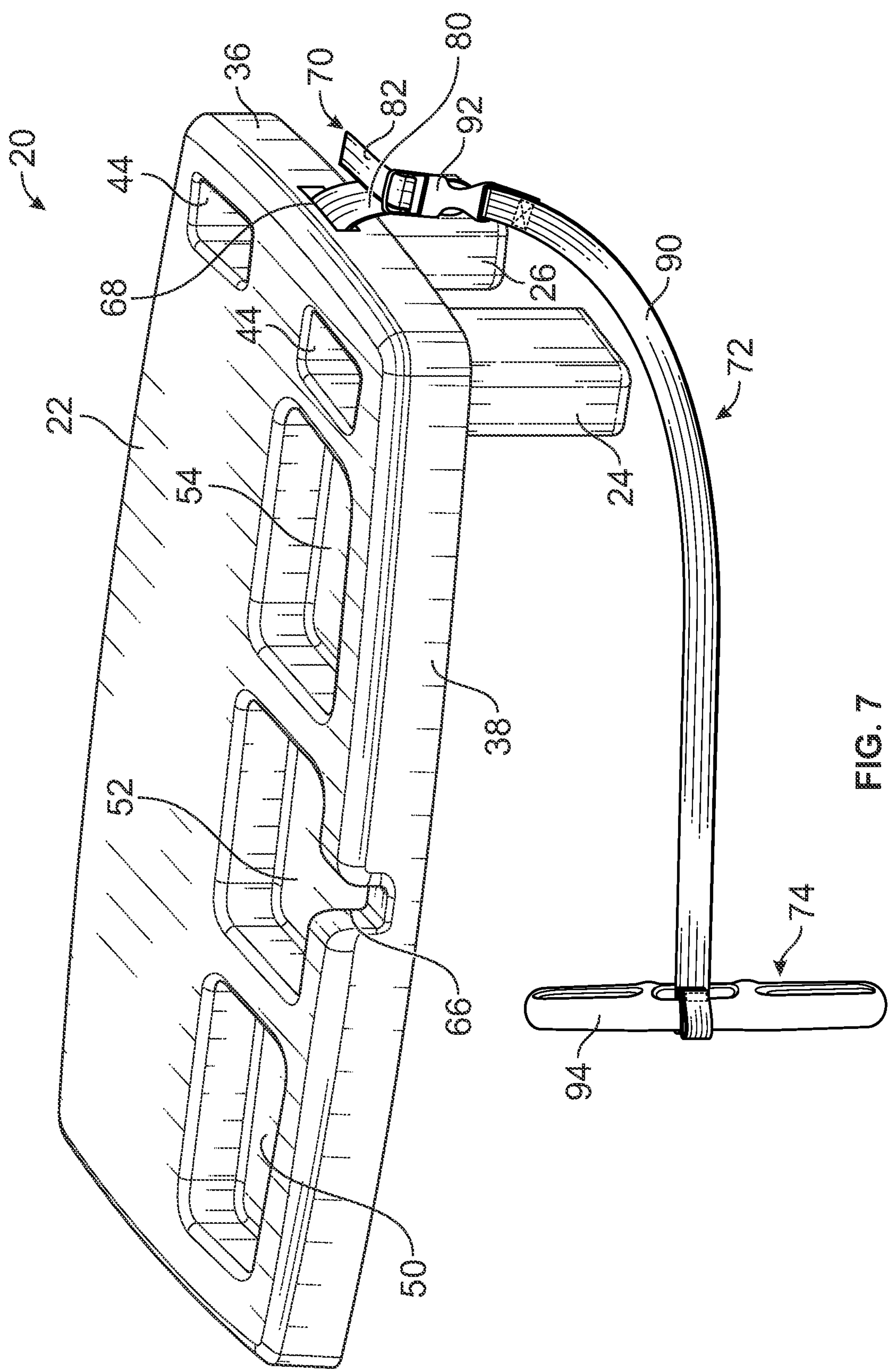
FIG. 7 depicts a top perspective view of the portable tray having a strap and seat anchor attached thereto.
Figure 8:
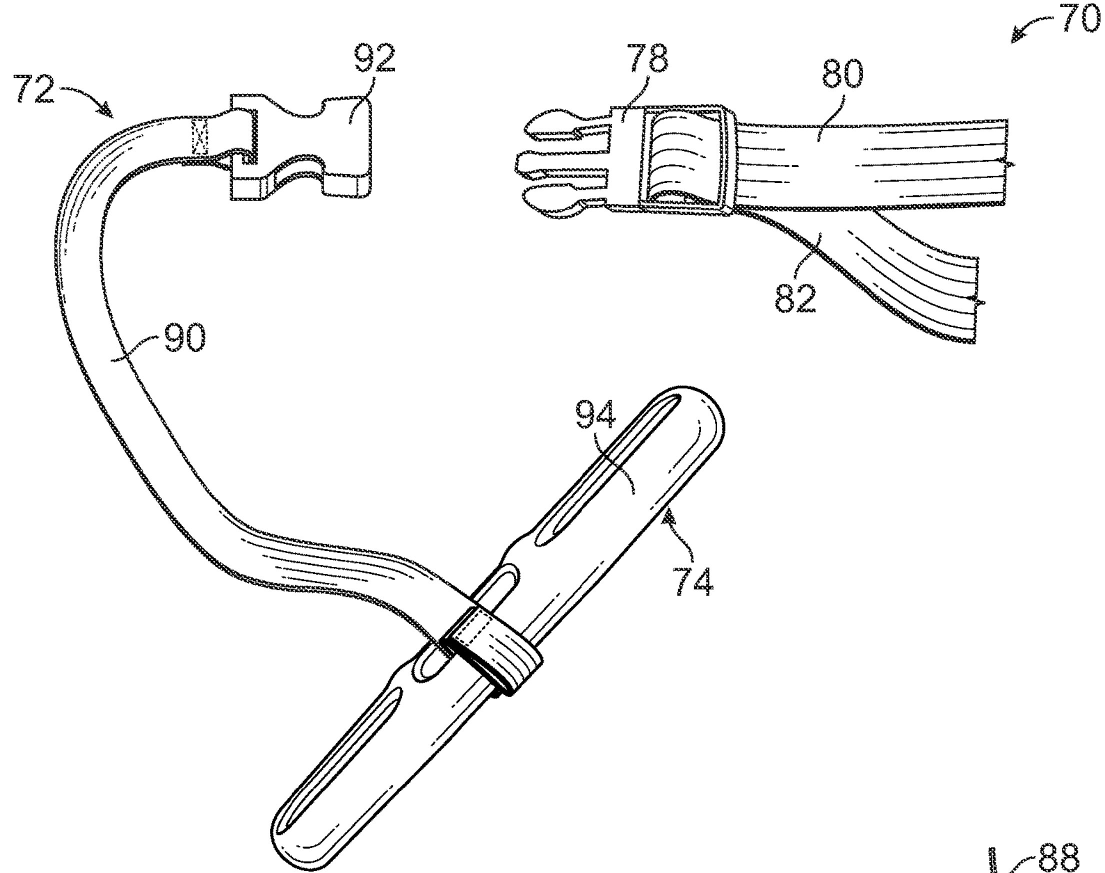
FIG. 8 depicts an exploded, perspective view of the strap and seat anchor.
Figure 9:
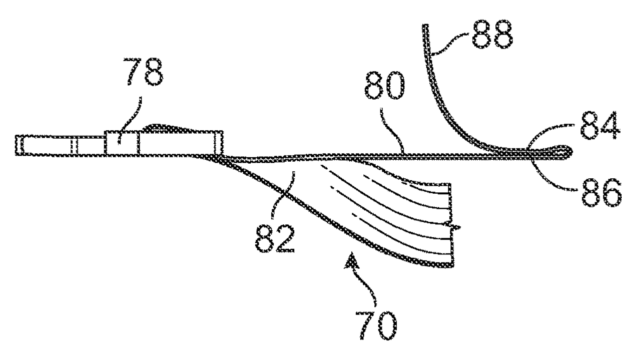
FIG. 9 depicts a partial side elevation view of a part of the strap.

In an embodiment, the rear wall 36 includes an opening 68 therethrough which may be centered along the rear wall 36. As shown in FIGS. 7-9, a first strap 70 is mounted through the opening 68 such that the first strap 70 is attached to the tray 20 and cannot be easily released therefrom. A second strap 72 is attached to the first strap 70 and has a seat anchor 74 at an end thereof.

The first strap 70 has a flexible fabric portion 80, 82 having a buckle 78 attached thereto along its length such that a first part 80 of the fabric portion is on a first side of the buckle 78 and a second part 82 of the fabric portion is on a second side of the buckle 78. In use, the first part 80 is attached to the rear wall 36 through the opening 68. The second part 82 extends from the buckle 78 and can be grasped by a user. The length of the first part 80 can be adjusted by pulling/pushing the second part 82 through the buckle 78 to shorten/lengthen the first part 80.

In an embodiment, the first part 80 has a thickened portion 84 which may be formed by doubling the first part 80 back onto itself to form two layers and securing the doubled parts together by a weld 86, and thereby forming a tail portion 88 of the first part 80. To attach the first part 80 to the tray 20 through the opening 68, the thickened portion 84 and the tail portion 88 are passed through the opening 68 until the tail portion 88 completely passes through the opening 68. As a result, the thickened portion 84 and the tail portion 88 are on one side of the rear wall 36 and the buckle 78 and the remainder of the first part 80, which is formed by a single layer of the first part 80, are on the other side of the rear wall 36. The thickened portion 84 can be inserted through the opening 68 from forward of the rear wall 36, or rearward of the rear wall 36. The tail portion 88 engages with the rear wall 36 and prevents the easy passage of the thickened portion 84 back through the opening 68.

The second strap 72 has a flexible fabric portion 90 having a buckle 92 attached at a first end thereof and the seat anchor 74 attached at the second end thereof. The buckle 92 releasably mates with the buckle 78 in a known manner.

The seat anchor 74 is affixed to the second end of the fabric portion 90 of the second strap 72. The seat anchor 74 may have an elongated body 94 which has a longitudinal axis that is perpendicular to a longitudinal axis of the fabric portion 90.

In use, the seat anchor 74 is inserted between the cushions of the seat where the tray 20 is being installed and pushed therebetween until the seat anchor 74 cannot be easily pulled out. At least some of the fabric portion 90 will be inserted between the cushions. Because the straps 70, 72 are mated together by the buckles 78, 92, and the strap 70 is attached to the tray 20, the seat anchor 74 anchors the tray 20 into position. The length of the first part 80 can be adjusted to adjust the position of the tray 20 toward or away from the upright seat cushion.

In an embodiment, the first part 80 has hook and loop fasteners, commonly sold under the trademark VELCRO provided thereon so that the first part 80 can pass through the opening 68 and be affixed to itself to attach the first strap 70 to the tray 20.

The tray 20 may be formed of plastic, composite materials, metal, canvas, leather or other synthetic or natural materials.

The tray 20 is portable such that the tray 20 can be moved from one seat in the vehicle to another seat, or to another vehicle.

Figure 10:
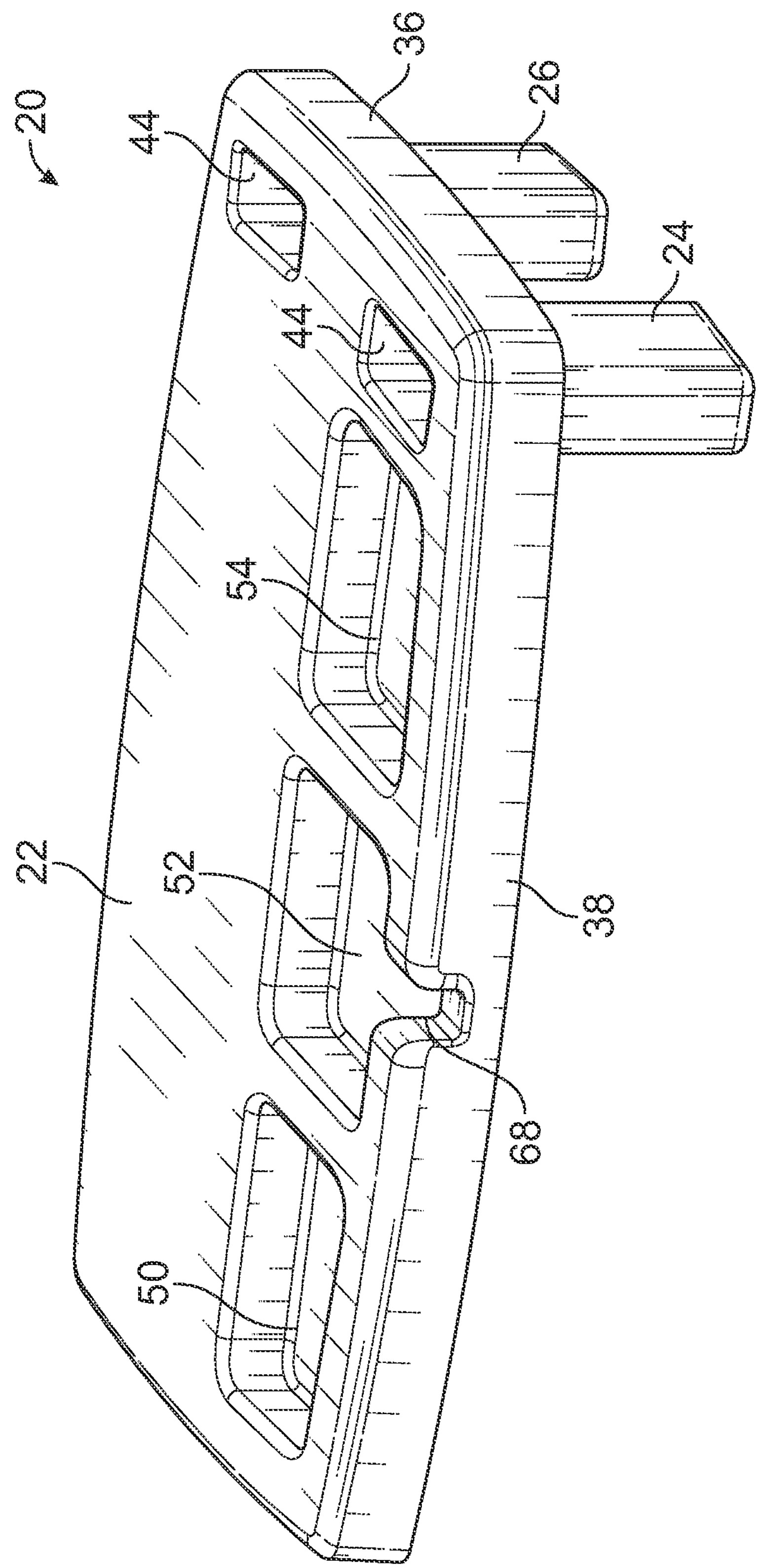
FIG. 10 depicts a top perspective view of an alternate embodiment of the portable tray.

The gripping member 64 and/or the opening 68 may be omitted as shown in FIG. 10.

While a particular embodiment is illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiment illustrated in and discussed with respect to the drawings and that modifications and other embodiments are intended to be included within the scope of the disclosure and appended drawings. Moreover, although the foregoing descriptions and the associated drawings describe an example embodiment in the context of certain example combinations of elements and/or functions, it should be appreciated that different combinations of elements and/or functions may be provided by alternative embodiments without departing from the scope of the disclosure and the appended claims.

What is claimed is:

1. A portable tray for use in a motor vehicle comprising:

a base adapted to be supported on a vehicle seat, the base including a front end, a rear end, opposite side edges, an upper surface and a lower surface, the front end being positionable toward a front portion of the vehicle seat and the lower surface at the front end being configured to rest on the vehicle seat, the rear end being positionable toward a rear portion of the vehicle seat, the upper surface including a planar portion operating as a support surface for articles being used by an occupant of the motor vehicle, a cavity extending down from the upper surface and forming a cup into which articles can be placed, the cup having a side wall extending down from the upper surface and a bottom wall at a bottom end thereof, a recess extending down from the upper surface and through the side wall and in communication with the cavity, wherein an object can pass through the recess and into the cavity, and an opening provided through the rear end;

a pair of spaced apart legs depending from the lower surface at the rear end of the base, the legs being configured to rest on the vehicle seat, wherein the opening is provided through the rear end between the legs; and a strap having a seat anchor attached thereto, the strap passing through the opening, the strap being adjustable in length.

2. The portable tray as defined in claim 1, wherein the cavity defines a first cavity and further comprising a second cavity extending down from the upper surface and forming a second cup, the second cavity being spaced from the first cavity.

3. The portable tray as defined in claim 2, wherein the second cavity is linearly aligned with the second cavity and each cavity is proximate to a same side edge of the base.

4. The portable tray as defined in claim 1, further comprising at least one hook depending from the front end, wherein an object can be hung from the at least one hook.

5. The portable tray as defined in claim 1, further comprising a plurality of support ribs extending from the lower surface.

6. The portable tray as defined in claim 1, further comprising a gripping member attached to the upper surface.

7. The portable tray as defined in claim 6, wherein the gripping member is formed of rubber.

8. The portable tray as defined in claim 6, wherein the gripping member is proximate to the front end and side edges of the base.

9. The portable tray as defined in claim 1, wherein each leg has a cavity therein which extends from the upper surface.

10. The portable tray as defined in claim 1, wherein the strap has a doubled portion which is configured to be positioned on a front side of the rear end, and a single portion which is configured to be positioned on a rear side of the rear end.

11. A portable tray for use in a motor vehicle comprising:

a base adapted to be supported on a vehicle seat, the base including a front end, a rear end, an upper surface, a lower surface, and first and second side edges, the front end being positionable toward a front portion of the vehicle seat and the lower surface at the front end being configured to rest on the vehicle seat, the rear end being positionable toward a rear portion of the vehicle seat, the upper surface operating as a support surface for articles being used by an occupant of the motor vehicle, a first cavity extending down from the upper surface and forming a first cup into which articles can be placed, the first cup having a side wall extending down from the upper surface and a bottom wall closing a bottom end thereof, wherein the first cup defines opposite front and rear ends, an outer side end and an opposite inner side end, a second cavity extending down from the upper surface and forming a second cup into which articles can be placed, the second cup having a side wall extending down from the upper surface and a bottom wall closing a bottom end thereof, wherein the second cup defines opposite front and rear ends, an outer side end and an opposite inner side end, the front end of the second cup being spaced from the rear end of the first cup, the outer side ends of the first and second cups being proximate to the first side edge of the base, wherein a planar portion of the upper surface operating as a support surface for articles being used by an occupant of the motor vehicle extends continuously from the front end of the first cup to the rear end of the second cup and extends continuously from the inner side ends of the first and second cups to the second side edge of the base; and a pair of spaced apart legs depending from the lower surface at the rear end of the base, the legs being configured to rest on the vehicle seat.

12. The portable tray as defined in claim 11, further comprising an opening provided through a rear end, and a strap having a seat anchor attached thereto, the strap extending through the opening and having a thickened portion, wherein the strap is adjustable in length.

13. The portable tray as defined in claim 12, wherein the strap includes a first part having a buckle along its length, the thickened portion being provided as part of the first part, and a second part having a buckle along its length, the buckles being releasably mated together.

14. The portable tray as defined in claim 12, wherein the thickened portion is formed by two layers of the strap.

15. The portable tray as defined in claim 11, further comprising at least one hook depending from the front end, wherein an object can be hung from the at least one hook.

16. The portable tray as defined in claim 11, further comprising a gripping member attached to the upper surface.

17. The portable tray as defined in claim 11, wherein each leg has a cavity therein which extends from the upper surface.

* * * * *